US008635162B2

(12) United States Patent
Burkhart et al.

(10) Patent No.: US 8,635,162 B2
(45) Date of Patent: Jan. 21, 2014

(54) CREATING RULES FOR THE ADMINISTRATION OF END-USER LICENSE AGREEMENTS

(75) Inventors: Michael J. Burkhart, Round Rock, TX (US); Daniel G. Eisenhauer, Austin, TX (US); Daniel M. Schumacher, Pflugerville, TX (US); Thomas J. Watson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1290 days.

(21) Appl. No.: 11/246,581

(22) Filed: Oct. 7, 2005

(65) Prior Publication Data

US 2007/0083926 A1  Apr. 12, 2007

(51) Int. Cl.
G06F 21/00 (2013.01)
G06F 21/22 (2006.01)

(52) U.S. Cl.
USPC ............. 705/59; 705/51; 705/57; 705/58

(58) Field of Classification Search
USPC .......................................... 705/59
See application file for complete search history.

(56) References Cited

U.S. PATENT DOCUMENTS

| 5,553,143 | A  | * | 9/1996 | Ross et al. ............... 705/59 |
| 5,910,987 | A  | * | 6/1999 | Ginter et al. ............ 705/52 |
| 6,959,289 | B1 |   | 10/2005 | James |
| 7,055,740 | B1 | * | 6/2006 | Schultz et al. ......... 235/381 |
| 7,231,668 | B2 | * | 6/2007 | Jacobson ................ 726/26 |
| 7,664,951 | B2 | * | 2/2010 | Fujinami ................ 713/168 |
| 7,734,550 | B1 | * | 6/2010 | Bennett et al. ........... 705/59 |
| 2002/0019814 | A1 | * | 2/2002 | Ganesan ................. 705/59 |
| 2002/0107809 | A1 | * | 8/2002 | Biddle et al. ............. 705/59 |
| 2003/0120557 | A1 | * | 6/2003 | Evans et al. ............. 705/26 |
| 2004/0220926 | A1 | * | 11/2004 | Lamkin et al. ............. 707/3 |
| 2005/0010532 | A1 | * | 1/2005 | Garibay et al. .......... 705/59 |
| 2005/0038752 | A1 |   | 2/2005 | Gaetano et al. |
| 2005/0125358 | A1 |   | 6/2005 | Levin et al. |
| 2005/0125359 | A1 |   | 6/2005 | Levin et al. |
| 2006/0116966 | A1 |   | 6/2006 | Pedersen |
| 2007/0188712 | A1 | * | 8/2007 | Kutner .................... 353/15 |
| 2009/0265278 | A1 | * | 10/2009 | Wang et al. ............ 705/54 |

OTHER PUBLICATIONS

EULAlyzer, Sep. 2005.*
"U.S. Appl. No. 11/277,628 Office Action", Sep. 8, 2006, 11 pages.
"U.S. Appl. No. 11/277,640 Office Action", Dec. 13, 2007, 7 Pages.
"U.S. Appl. No. 11/277,640 Final Office Action", Jan. 13, 2009, 9 Pages.
"U.S. Appl. No. 11/277,640 Final Office Action", Apr. 4, 2007, 9 Pages.
"U.S. Appl. No. 11/277,640 Office Action", Jul. 8, 2011, 6 pages.
"U.S. Appl. No. 11/277,640 Office Action", Jul. 12, 2006, 7 pages.

* cited by examiner

*Primary Examiner* — Evens J Augustin
(74) *Attorney, Agent, or Firm* — DeLizio Gilliam, PLLC

(57) ABSTRACT

Exemplary methods, systems, and products are described for creating rules for the administration of end-user license agreements ('EULAs'). Creating rules for the administration of end-user license agreements is accomplished by identifying, from historical license data, a license administration pattern. A license administration rule is then created in dependence upon the license administration pattern. Identifying a license administration pattern from historical license data may include data mining a collection of accepted EULAs and data mining a collection of rejected EULAs.

22 Claims, 11 Drawing Sheets

CREATING RULES FOR THE ADMINISTRATION OF END-USER LICENSE AGREEMENTS

BACKGROUND OF THE INVENTION

1. Field of the Invention

The field of the invention is data processing, or, more specifically, methods, systems, and products for creating rules for the administration of end-user license agreements.

2. Description of Related Art

Employees often have the ability to access material subject to end-user license agreements ('EULAs') despite employer policies which may prevent or limit the employees' access of that material. Often within a company, or other large organizations, the current process for gaining access to material governed by an end-user license agreement ('EULA') generally involves a user contacting their legal representative and providing legal representative with detailed data (company name, document location, license location) about the material they are trying to access and the governing EULA. The legal representative then typically reviews the EULA requiring the legal representative to pour through pages of license information to determine the issues and consequences of granting access to the new material. Even if the same or similar EULA has been previously approved, it can take hours or even days to get the approval from the legal representative using this manual process. If the license has not already been approved, this process can take days or even weeks, which can cost companies dearly in time to market for their products.

SUMMARY OF THE INVENTION

Exemplary methods, systems, and products are described for creating rules for the administration of end-user license agreements ('EULAs'). Creating rules for the administration of end-user license agreements is accomplished by identifying, from historical license data, a license administration pattern. A license administration rule is then created in dependence upon the license administration pattern. Identifying a license administration pattern from historical license data may include data mining a collection of accepted EULAs and data mining a collection of rejected EULAs.

Creating a license administration rule in dependence upon the license administration pattern includes defining one or more conditions for accepting an EULA in dependence upon the license administration pattern and associating an action with the one or more conditions. Creating a license administration rule in dependence upon the license administration pattern also includes defining one or more conditions for rejecting an EULA in dependence upon the license administration pattern and associating an action with the one or more conditions.

Creating rules for the administration of end-user license agreements may also include determining whether one or more new license administration rules supersede one or more old license administration rules. An action may be executed in response to determining that one or more new license administration rules supersede one or more old license administration rules.

Creating rules for the administration of end-user license agreements may also include identifying from historical license data an EULA previously rejected based on one or more superseded license administration rules, and determining whether the previously rejected EULA would be allowed under a new license administration rule. If the previously rejected EULA would be allowed under the new license administration rule, an action may be executed.

Creating rules for the administration of end-user license agreements may also include determining that a threshold number of new license administration rules have been created, and executing an action in response to determining that a threshold number of new license administration rules have been created.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for creating rules for the administration of end-user license agreements.

Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executed on computer hardware, nevertheless, alternative embodiments implemented as firmware or as hardware are well within the scope of the present invention.

DETAILED DESCRIPTION

Figure 1:
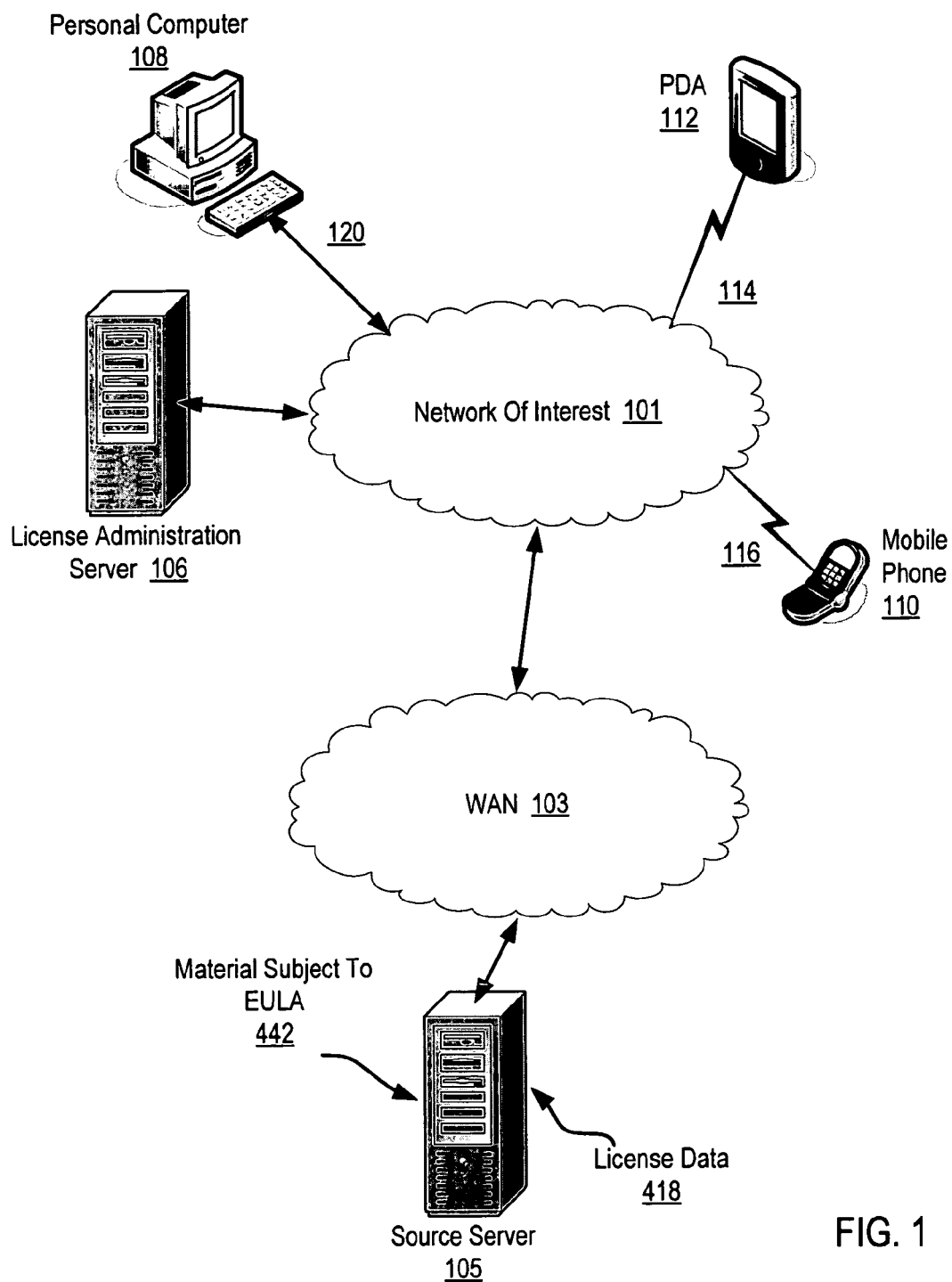
FIG. 1 sets forth a network diagram illustrating an exemplary system for administration of end-user license agreements.

Exemplary methods, systems, and products for administration of end-user license agreements according to embodiments of the present invention are described with reference to the accompanying drawings, beginning with FIG. 1. FIG. 1 sets forth a network diagram illustrating an exemplary system for administering end-user license agreements according to embodiments of the present invention. The system of FIG. 1 operates generally to administer end-user license agreements according to embodiments of the present invention by receiving license data in a response to a user's request for access to material subject to an end-user license agreement ('EULA'), determining, in dependence upon the license data and one or more license administration rules, whether terms of the EULA are acceptable, and indicating to the user whether the terms of the EULA are acceptable. A 'EULA' refers to any licensing agreement. EULAs typically govern use, access, distribution, replication of the material subject to the EULA. EULAs are also sometimes referred to simply as licenses, or software licenses, although the term 'software license' in this context is not intended to limit the term to executable software only, rather the term is used broadly to include any material that may be subject to a license and accessible using computing machinery.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

The system of FIG. 1 includes several exemplary client devices connected through a network of interest (101) and wide area network (103) to a source server (105). The client computers in the example of FIG. 1 include a personal computer (108) connected to network of interest (101) through wire line connection (120), a wireless, network-enabled personal digital assistant ('PDA')(112) connected to network of interest (101) through wireless connection (114), and mobile telephone (110) connected to network of interest (101) through wireless connection (116). In the system of FIG. 1, network of interest (101) is a network of commonly controlled devices. That is, the network of interest includes devices that are owned or operated by a common entity, such as a network of a company, or a network of a division of a company.

Client computers are computers capable of interacting with a user and with other computer devices. The client computers of FIG. 1 each have installed upon them a license administration module capable generally of receiving, in a response to a user's request for access to material subject to an end-user license agreement ('EULA'), license data and indicating to the user whether the terms of the EULA are acceptable. In the example of FIG. 1, the license administration module installed on the client computers are capable of sending license data to the license administration server (106) and receiving from the license administration server a determination whether or not the EULA is acceptable. 'License data' refers to information about a EULA. The license data may include, for example, the text of EULA, meta-data regarding the EULA, program code configured to allow the user to view the EULA and to accept or reject the EULA or any other information describing the EULA governing the requested material.

The license administration server (106) of FIG. 1 has installed on it a license administration module capable generally of determining whether terms of an EULA are acceptable in dependence upon license data and one or more license administration rules. The license administration module of the license administration server (106) may also be configured to create rules for the administration of EULAs by identifying a license administration pattern from historical license data, and creating a license administration rule in dependence upon the license administration pattern.

License administration rules are conditional expressions which individually or collectively establish conditions for accepting or rejecting an EULA. A simple example of license administration rules is shown below for further explanation:

```
Rule = acceptable license source
    IF license source = Company X
        THEN license acceptable.
```

The example above sets forth a license administration rule entitled "acceptable license source". The administration rule includes the condition "IF license source=Company X". If the license data indicates that the EULA is from a source called "Company X," then the exemplary license administration rule dictates that the license is acceptable.

In the system of FIG. 1, a source server (105) is connected to a wide area network ('WAN') (103) which is connected to network of interest (101). Source server (105) is a server providing material (442) subject to an EULA and license data (418) regarding the EULA. The source server (105) of FIG. 1 is capable generally of responding to requests to access the material (442) subject to an EULA and sending license data (418). The source server (105) of FIG. 1 is typically configured to inhibit access to the material (442) subject to a EULA unless the user accepts the EULA.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
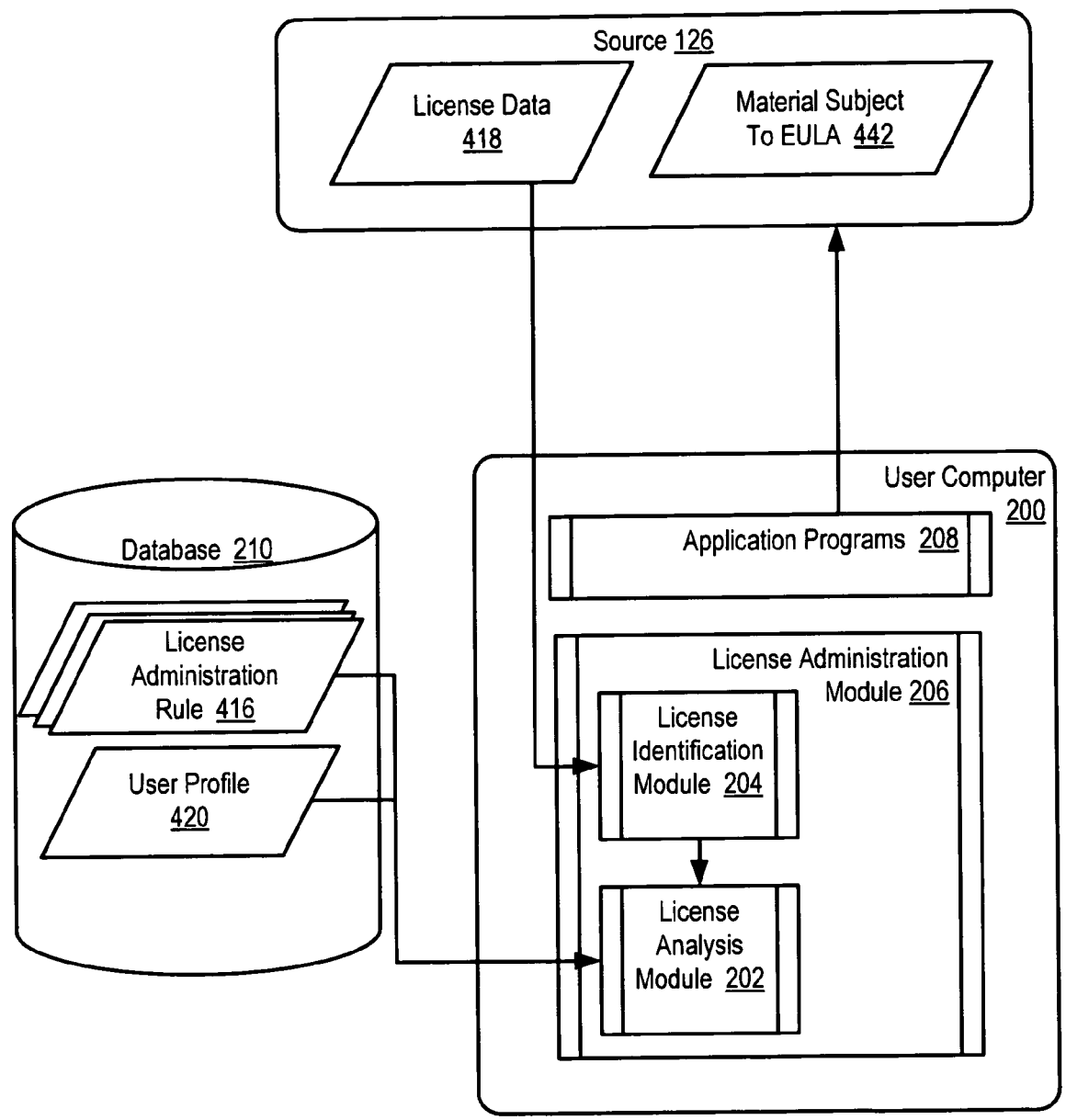
FIG. 2 sets forth a block diagram of an exemplary system for administration of end-user license agreements.

For further explanation, FIG. 2 sets forth a block diagram of an exemplary system for administering end-user license agreements ('EULAs') according to embodiments of the present invention. The system of FIG. 2 operates generally to administer end-user license agreements according to embodiments of the present invention by receiving license data (418) in a response to a user's request for access to material (442) subject to an EULA, determining whether terms of the EULA are acceptable, in dependence upon the license data (418) and one or more license administration rules (416), and indicating to the user whether the terms of the EULA are acceptable.

The system of FIG. 2 includes a user computer (200) which includes one or more application programs (208), computer program instructions that enable a user to access, display, and interact with material that may be subject to a EULA such as files hosted by servers, held in a file systems, or other material as will occur to those of skill in the art. One example of application programs (208) useful in accessing material subject to EULAs is a browser, computer program instructions for accessing, displaying or interacting with files hosted by a server or held in a file system. Browsers available for personal computers include Microsoft Internet Explorer, Mozilla Firefox, Opera, and Safari. Another example of an application program useful in accessing material subject to EULAs is an installation program, computer program instructions for installing computer programs onto user computer (200). Installation programs available for personal computers include InstallShield, InstallAnywhere, and Microsoft Windows Installer. Browsers and installation programs are included for explanation and not for limitation. In fact, many applications are capable of requesting and receiving material subject to a EULA and all such programs may be used with the present invention.

In the system of FIG. 2, the application program (208) requests access to material subject to a EULA (442) from a source (126) based on input from a user. In response to the request for access to the material, the source (126) sends license data (418) to a license administration module (206) also installed on the user computer (200). License administration module (206) includes a license identification module (204), computer program instructions for identifying that a response received by user computer (200), in response to a request for access to material, includes an indication that the material is subject to an EULA. License identification module (204) operates generally by identifying license data, such as metadata or keywords, in the response which indicates the existence of the EULA.

License administration module (206) also includes a license analysis module (202), computer program instructions for determining, in dependence upon the license data (418) and one or more license administration rules (416), whether terms of the EULA are acceptable. In the example of FIG. 2, the license analysis module (202) retrieves license administration rules (416) from a database (210). In the system of FIG. 2, the license analysis module (202) is also capable of retrieving a user profile (420) for the user operating the application program (208) and determining, in dependence upon the license data (418), the license administration rules (416) and the user profile, whether terms of the EULA are acceptable. Upon determining whether terms of the EULA are acceptable, the license administration module is capable of indicating to a user whether the terms of the EULA are acceptable.

Figure 3:
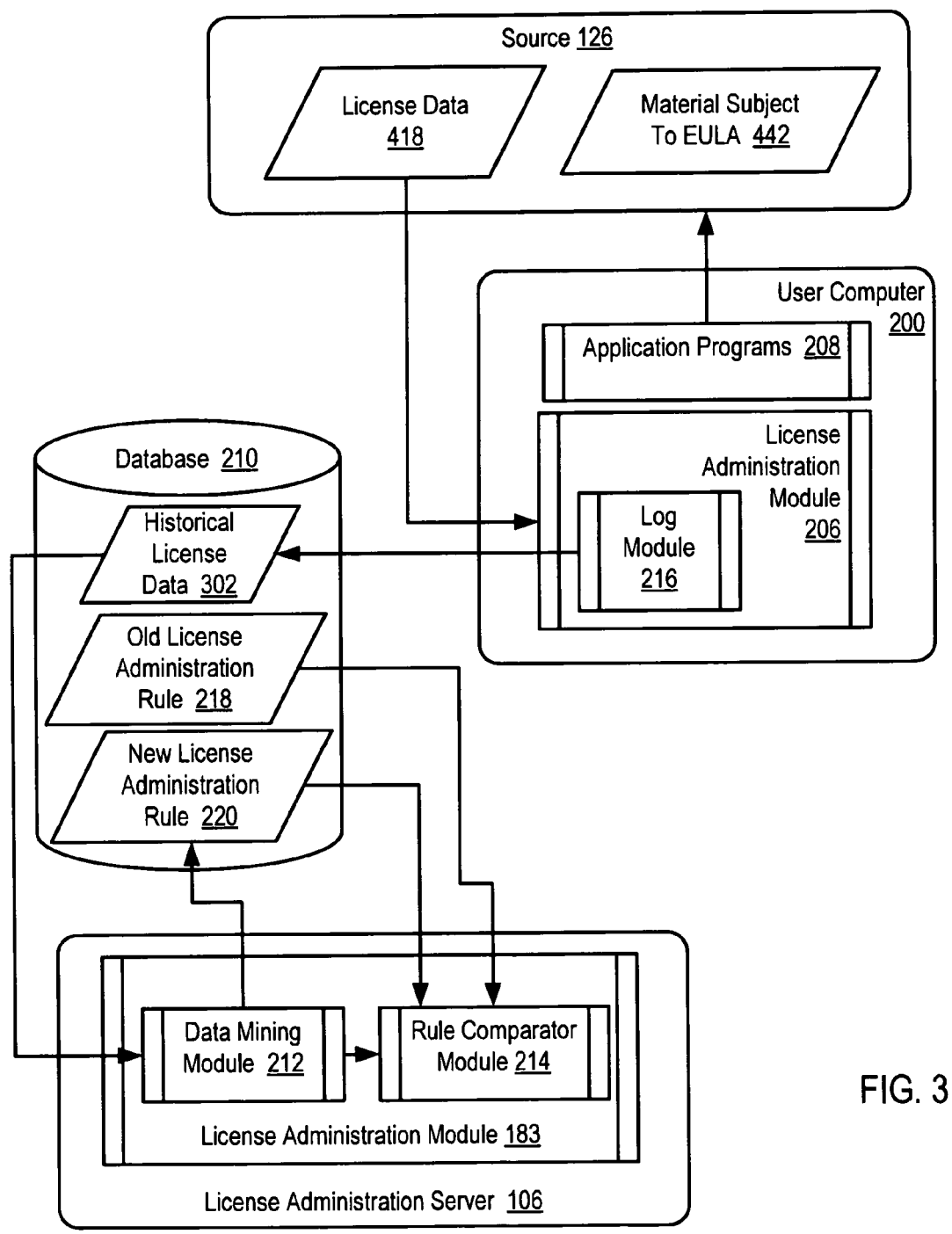
FIG. 3 sets forth a block diagram of an exemplary system for creating rules for the administration of end-user license agreements.

For further explanation, FIG. 3 sets forth a block diagram of an exemplary system for creating rules for the administration of end-user license agreements according to embodiments of the present invention. The system of FIG. 3 operates generally to create license administration rules (220) according to embodiments of the present invention by identifying a license administration pattern from historical license data (302), and creating a license administration rule (220) in dependence upon the license administration pattern.

The system of FIG. 3 includes a user computer (200) having application programs (208). In the system of FIG. 3, application programs (208) request access to material subject to a EULA (442) from a source (126), such as source server (105 in FIG. 1), often based on input from a user. In response to the request for access to the material subject to the EULA, source (126) sends license data (418) to the license administration module (206). Application programs (208) may alternatively request access to material subject to a EULA (442) already downloaded to the same computer on which the application programs are running. That is, material subject to a EULA may already reside on the computer on which the application programs are running.

License administration module (206) of FIG. 3 includes a log module (216), computer program instructions for recording license data (418) in a memory. In the example of FIG. 3, log module (216) of license administration module (206) records the received license data (418) in a database (210).

The system of FIG. 3 also includes a license administration server (106) in communication with the database (210). License administration server (106) has installed upon it a license administration module (183) including a data mining module (212), computer program instructions for identifying a license administration pattern from historical license data (302), and creating a license administration rule (220) in dependence upon the license administration pattern. One example of off-the-shelf data mining software suitable for use as data mining module (212) is IBM's® "Intelligent Miner." "Intelligent Miner" can be operated in several computing environments including AIX, AS/400, and OS/390. The Intelligent Miner is an enterprise data mining tool, designed for client/server configurations and optimized to mine very large data sets, such as gigabyte data sets. The Intelligent Miner includes a plurality of data mining techniques or tools used to analyze large databases and provides visualization tools used to view and interpret the different mining results.

The license administration module (183) of FIG. 3 also includes a rule comparator module (214), computer program instructions for determining whether one or more new license administration rules (220) supersede one or more old license administration rules (218). An old license administration rule is any existing license administration rule. The term 'old' is not used to indicate any requirement of age and is used herein to distinguish such an existing license administration rule from a newly created license administration rule. A new license administration rule supersedes an old license administration rule if a EULA rejected by the new license administration rule is acceptable under an old license administration rule, or if a EULA acceptable under the new license administration rule is rejected by the old license administration rule. If rule comparator module (214) determines that one or more new license administration rules (220) supersede one or more old license administration rules (218), license administration module (183) may execute an action, such as for example, deleting one or more superseded rules.

Administering end-user license agreements in accordance with the present invention is generally implemented with computers, that is, with automated computing machinery. For further explanation, therefore, FIG. 4 sets forth a block diagram of automated computing machinery comprising an exemplary client computer (152) useful in administering EULAs according to embodiments of the present invention. Client computer (152) of FIG. 4 includes at least one computer processor (156) or 'CPU' as well as random access memory (168) ("RAM") which is connected through a system bus (160) to processor (156) and to other components of the computer.

Stored in RAM (168) are application programs (208), computer program instructions that enable a user to access, display and interact with material that may be subject to a EULA such as files hosted by servers, held in a file systems, or other material as will occur to those of skill in the art. Also in stored RAM (168) is a license administration module (206), a set of computer program instructions improved for administering EULAs according to embodiments of the present invention.

Figure 4:
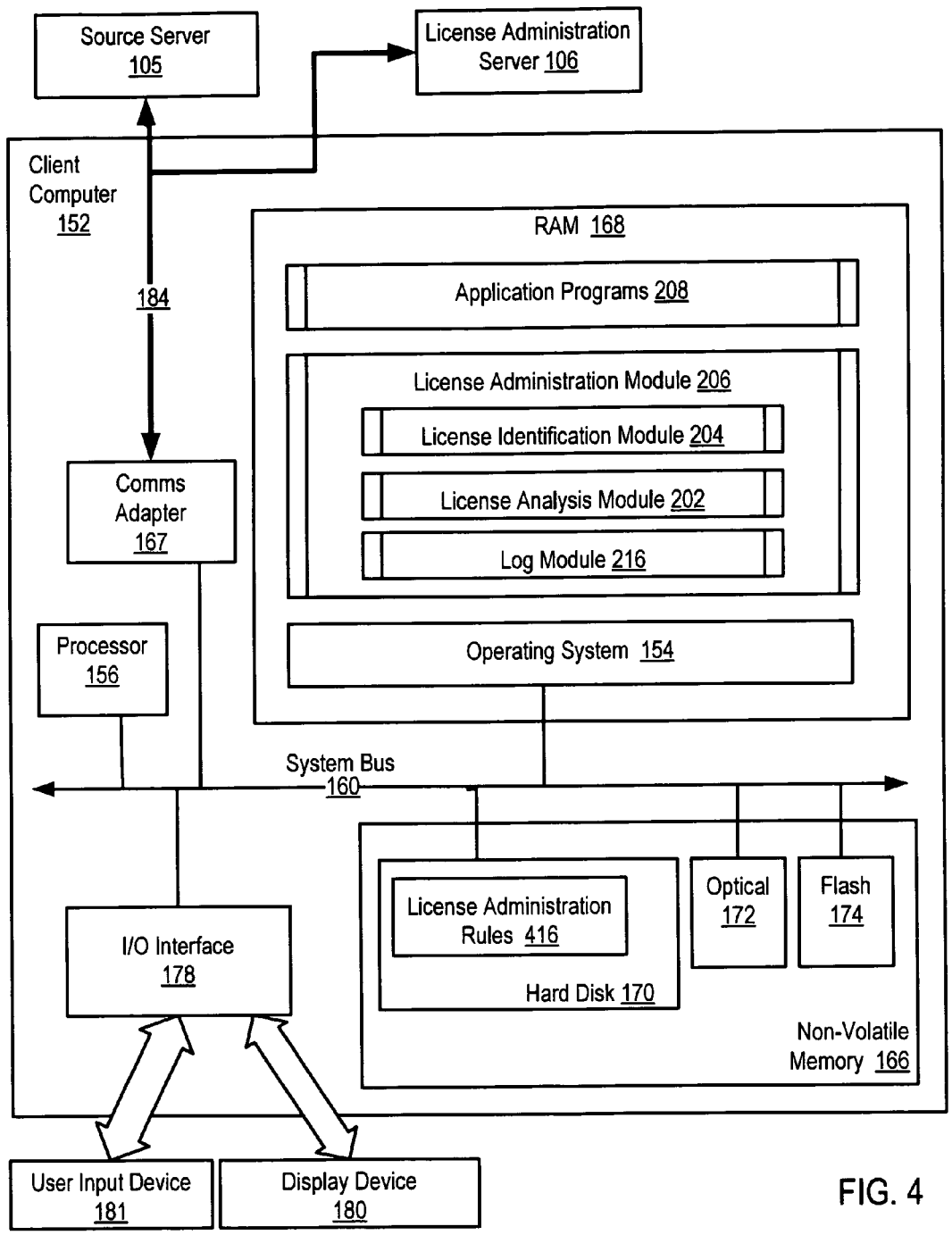
FIG. 4 sets forth a block diagram of automated computing machinery comprising an exemplary computer useful in administration of end-user license agreements.

The license administration module (206) of FIG. 4 includes a license identification module (204), computer program instructions for identifying that a response received by client computer (152), in response to a request for access to material, includes an indication that the requested material is subject to a EULA. The license administration module (206) of FIG. 4 also includes a license analysis module (202), computer program instructions for determining, in dependence upon license data and one or more license administration rules (416), whether terms of the EULA are acceptable. License administration module (206) also includes a log module (216), computer program instructions for recording license data.

Also stored in RAM (168) is an operating system (154). Operating systems useful in computers according to embodiments of the present invention include UNIX™, Linux™, Microsoft Windows XP™, AIX™, IBM's i5/OS™, and others as will occur to those of skill in the art. Operating system (154), application programs (208), license administration module (206), license identification module (204), license analysis module (202), and log module (216) in the example of FIG. 4 are shown in RAM (168), but many components of such software typically are stored in non-volatile memory (166) also.

Client computer (152) of FIG. 4 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example client computer of FIG. 4 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary client computer (152) of FIG. 4 includes a communications adapter (167) for implementing data communications (184) with other computers, such as source server (105) and license administration server (106). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 5:
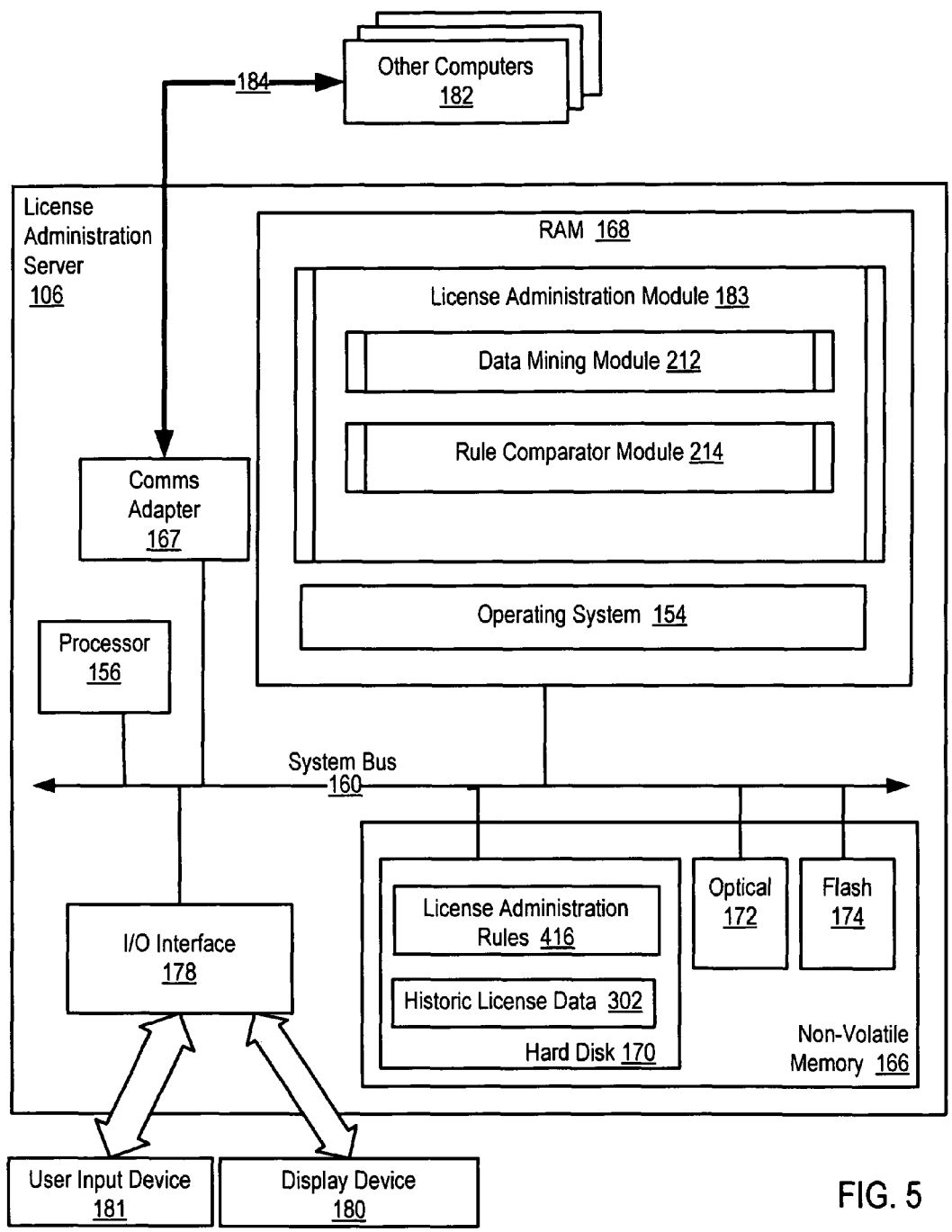
FIG. 5 sets forth a block diagram of automated computing machinery comprising an exemplary license administration server useful in creating rules for the administration of end-user license agreements.

For further explanation, FIG. 5 sets forth a block diagram of automated computing machinery comprising an exemplary license administration server (106) the administration of end-user license agreements according to embodiments of the present invention. License administration server (106) of FIG. 5 includes at least one computer processor (156) or 'CPU' as well as random access memory (168) ("RAM") which is connected through a system bus (160) to processor (156) and to other components of the computer.

Stored in RAM (168) is a license administration module (183), computer program instructions for administration of EULAs according to embodiments of the present invention. In the exemplary computer of FIG. 5, license administration module (183) is implemented as server-side application that interacts with one or more client agents on client computers of a network of interest to administer EULAs according to some embodiments of the present invention. License administration module (183) includes a data mining module (212), computer program instructions for identifying license administration patterns from historical license data (302), and creating license administration rules (416) in dependence upon the license administration patterns. License administration module (183) also includes a rule comparator module (214), computer program instructions for determining whether one or more new license administration rules supersede one or more old license administration rules.

Also stored in RAM (168) is an operating system (154). Operating systems useful in computers according to embodiments of the present invention include UNIX™, Linux™, Microsoft Windows XP™, AIX™, IBM's i5/OS™, and others as will occur to those of skill in the art. Operating system (154), license administration module (183), data mining module (212), and rule comparator module (214) in the example of FIG. 5 are shown in RAM (168), but many components of such software typically are stored in non-volatile memory (166) also.

License administration server (106) of FIG. 5 includes non-volatile computer memory (166) coupled through a system bus (160) to processor (156) and to other components of the computer (152 in FIG. 4). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary license administration server (106) of FIG. 5 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary license administration server (106) of FIG. 5 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 6:
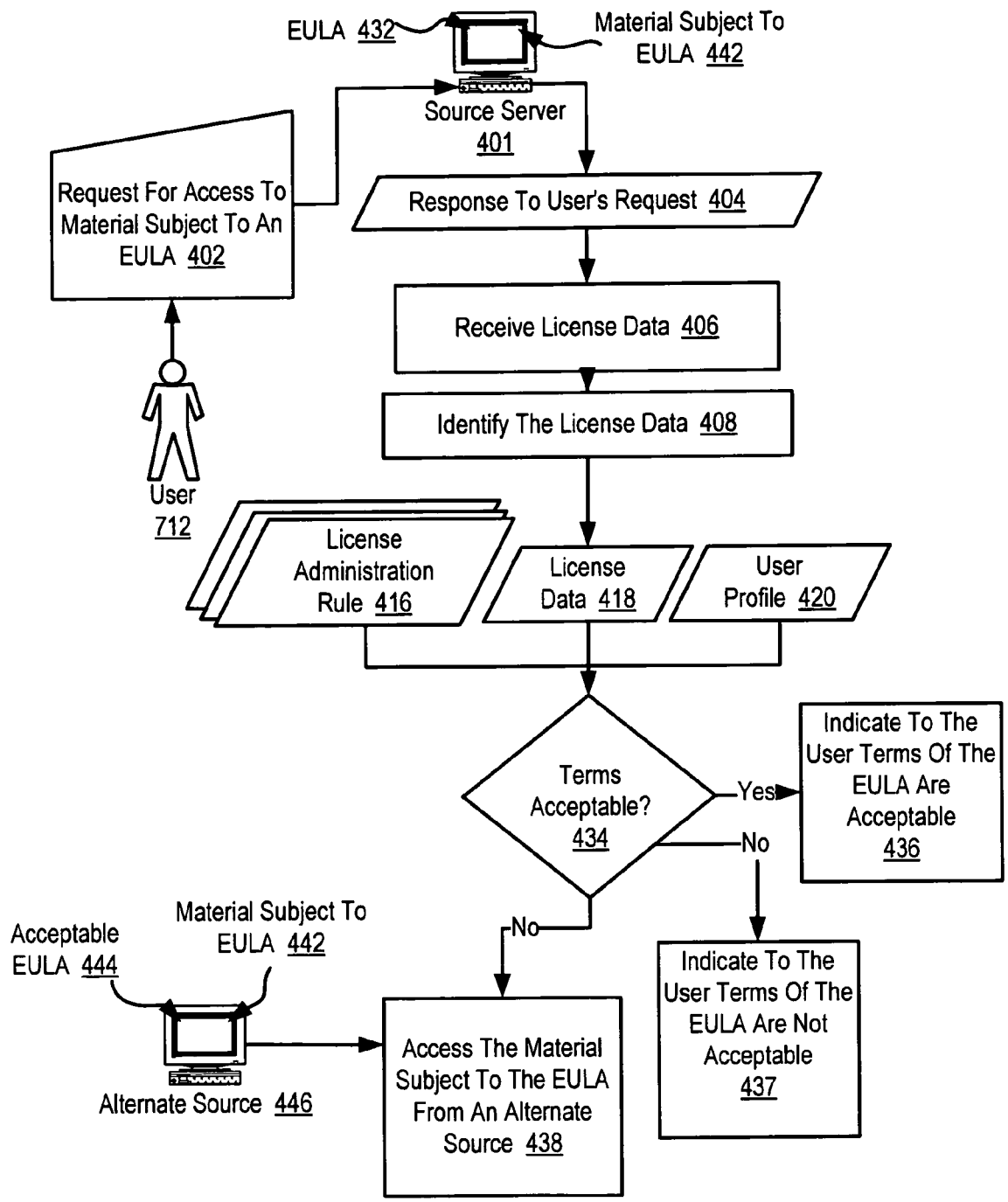
FIG. 6 sets forth a flow chart illustrating an exemplary computer-implemented method for administration of end-user license agreements.

For further explanation, FIG. 6 sets forth a flow chart illustrating an exemplary computer-implemented method for administration of EULAs according to embodiments of the present invention that includes receiving (406), in a response (404) to a user's request (402) for access to material (442) subject to EULA (432), license data (418). In the example of FIG. 6, the material (442) is subject to a EULA (432). As discussed above, a 'EULA' refers to any licensing agreement. EULAs typically govern use, access, distribution, replication of the material subject to the EULA. EULAs are also sometimes referred to simply as licenses, or software licenses, although the term 'software license' in this context is not intended to limit the term to executable software only, rather the term is used broadly to include any material that may be subject to a license and accessible using computing machinery.

The user (712) typically requests access to the material (442) subject to the EULA (432) by sending a request from the user's computer to a source server (401), which regulates access to the requested material (442). When access to the material is subject to the EULA, source servers generally reply to the request (402) to access the material by sending license data (418). License data is information describing the EULA governing the use of the requested material. License data may include, for example, the text of the EULA, metadata regarding the EULA, program code configured to allow the user to view the EULA and to accept or reject the EULA or any other information describing the EULA governing the use of the requested material.

The method of FIG. 6 also includes identifying (408) the license data (418) in the response (404) to the user's request for access to the material subject to the EULA. Identifying (408) the license data in the response (404) to the user's request for access to the material subject to the EULA may be carried out by monitoring responses to requests for access to the material made to source computers outside the immediate control of an organization administering end-user license agreements according to the present invention. A license administration module, installed as a plug-in in the application program or as an agent application on the user's computer, may be programmed to intercept information received in response to requests for material from sources outside the control of the user's organization to determine if the response includes license data indicating that the requested material is subject to a EULA.

The method of FIG. 6 also includes determining (434), in dependence upon the license data (418) and one or more license administration rules (416), whether terms of the EULA are acceptable. Determining whether terms of the EULA are acceptable may be carried out by determining whether one or more conditions defined in one or more license administration rules (416) for accepting an EULA are met. Determining whether terms of the EULA are acceptable may also include determining whether one or more conditions defined in one or more license administration rules for rejecting an EULA are met.

In the method of FIG. 6, determining whether terms of the EULA are acceptable is also dependent upon a user profile (420) of the user. That is, in the method of FIG. 6, a user profile (420) for the user (712) requesting access to the material subject to the EULA is referenced to determine if EULA should be accepted or rejected. User profiles typically include information such as user identification, user employment position, user permissions, and other information useful in determining whether the terms of the EULA are acceptable for the particular requesting user.

If the terms of the EULA (432) are acceptable, the method of FIG. 6 also includes indicating (436) to the user that the terms of the EULA are acceptable. Indicating (436) to the user that terms of the EULA are acceptable may be carried out by displaying a message to the user (712) indicating that the terms of the EULA are acceptable. Such a message may include an instruction to the user to accept the EULA, or other instruction as will occur to those of skill in the art.

If the terms of the EULA (432) are not acceptable, the method of FIG. 6 also includes indicating (437) to the user that the terms of the EULA are not acceptable. Indicating (437) to the user that terms of the EULA are not acceptable may be carried out by displaying a message to the user (712) indicating that the terms of the EULA are not acceptable. Such a message may include an instruction to the user to reject the EULA, or other instruction as will occur to those of skill in the art.

If the terms of the EULA (432) are not acceptable, the method of FIG. 6 alternatively also includes accessing (438) the material (442) subject to the EULA from an alternate source (446) where accessing the material from the alternate source is subject to an acceptable EULA (444). Accessing (438) the material (442) subject to the EULA from an alternate source (446) may be carried out by, for example, a license administration plug-in capable of directing the user to the alternate source, accessing the material (442) from the alternate source (446), and displaying the material (442) in the user's browser. Alternately, accessing (438) the material subject to the EULA (442) from an alternate source (446) may be carried out providing a user with a hyperlink to the alternate source (446) or in other ways as will occur to those of skill in the art.

Figure 7:
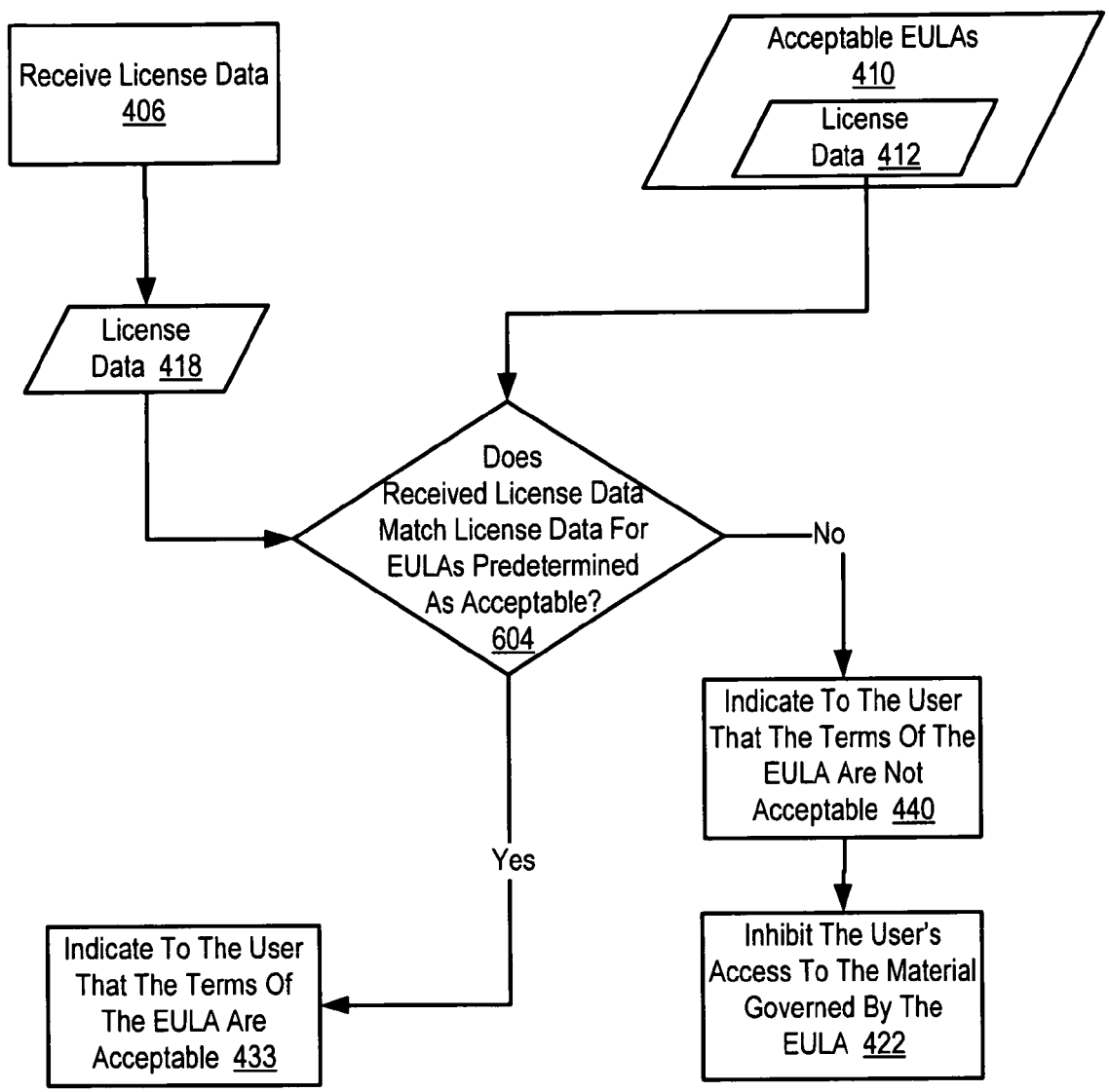
FIG. 7 sets forth a flow chart illustrating an exemplary computer-implemented method for determining whether terms of an EULA are acceptable.

For further explanation, FIG. 7 sets forth a flow chart illustrating an exemplary computer-implemented method for determining whether terms of a EULA are acceptable according to embodiments of the present invention. The method of FIG. 7 includes receiving (406) license data (418) and determining (604) whether the received license data (418) matches license data (412) for EULAs predetermined as acceptable (410). Determining (604) whether the received license data (418) matches license data (412) for EULAs predetermined as acceptable may be carried out by comparing the metadata received in the license data (418) identifying individual terms of the EULA or identifying a particular EULA with metadata in approved license data (412) for acceptable EULAs (410) stored in a database. Alternatively, determining (604) whether the received license data (418) matches license data (412) for EULAs predetermined as acceptable may be carried out by comparing the EULA word-for-word or term-by-term with license data (412) including acceptable EULAs or terms of acceptable EULAs (410).

If the received license data matches license data for EULAs predetermined to be acceptable, then the method of FIG. 7 includes indicating (433) to the user that the terms of the EULA are acceptable. Indicating (433) to the user that terms of the EULA are acceptable may be carried out by displaying a message to the user indicating that the terms of the EULA are acceptable. Such a message may include an instruction to the user to accept the EULA, or other instruction as will occur to those of skill in the art.

If the received license data does not match license data for EULAs predetermined to be acceptable, then the method of FIG. 7 includes indicating (440) to the user that the terms of the EULA are not acceptable. Indicating (440) to the user that terms of the EULA are not acceptable may be carried out by displaying a message to the user indicating that the terms of the EULA are acceptable. Such a message may include an instruction to the user to accept the EULA, or other instruction as will occur to those of skill in the art.

The method of FIG. 7 also includes inhibiting (422) the user's access to the material governed by the EULA if the terms of the EULA are not acceptable. Inhibiting (422) the user's access to the material subject to the EULA may be carried out by blocking access to the source server associated with the material subject to the EULA. Inhibiting (422) the user's access to the material subject to the EULA may also be carried out by automatically rejecting the EULA, for example, by sending a message directly to the source server to reject the EULA without intervention by the user, or in other ways as will occur to those of skill in the art.

Figure 8:
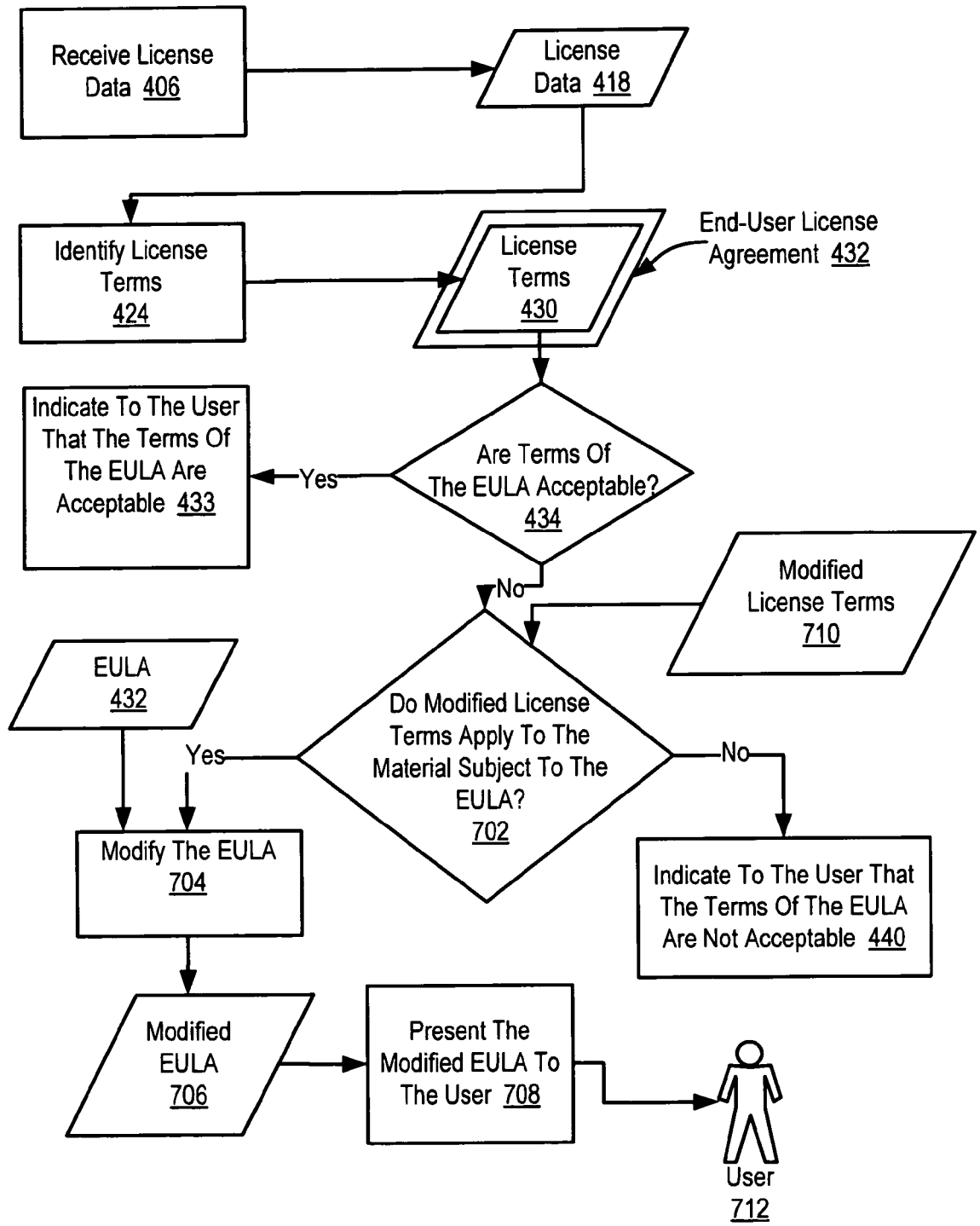
FIG. 8 sets forth a flow chart illustrating an exemplary computer-implemented method for determining whether modified license terms apply to the material subject to the EULA.

For further explanation, FIG. 8 sets forth a flow chart illustrating an exemplary computer-implemented method for determining whether modified license terms apply to the material subject to the EULA according to embodiments of the present invention. The method of FIG. 8 includes receiving (406) license data (418) and identifying (424) license terms (430) of a EULA (432) in dependence upon the license data. In the example of FIG. 8, the license data (418) includes the actual terms of the EULA itself.

The method of FIG. 8 also includes determining (434) whether the terms (430) of the EULA (432) are acceptable. If the terms of the EULA are acceptable, then the method includes indicating (433) to the user that the terms of the EULA are acceptable.

If the terms of the EULA are not acceptable, the method of FIG. 8 also includes determining (702) whether modified licensing terms (710) apply to the material subject to the end-user license (432). Determining (702) whether modified licensing terms (710) apply to the material subject to the end-user license (432) may be carried out, for example, by determining whether access to the same material has been approved under terms different than those included in the EULA (432).

If no modified terms apply to the material subject to the EULA, the method of FIG. 8 includes indicating (440) to the user that the terms of the EULA are not acceptable. Indicating to the user that terms of the EULA are not acceptable may be carried out by displaying a message to the user indicating that the terms of the EULA are not acceptable. Such a message may include an instruction to the user to reject the EULA, or other instruction as will occur to those of skill in the art.

If modified license terms do apply to the material subject to the EULA, the method of FIG. 8 includes modifying (704) the terms of the EULA (432). Modifying the terms of the EULA may be carried out by substituting modified license terms (710) for terms within the EULA (432), by appending modified license terms (710) to the EULA (432), by entirely replacing the EULA (432) with the modified license terms (710), or other such methods as will be apparent to those of skill in the art.

The method of FIG. 8 also includes presenting (708) the modified EULA (706) to the user (712). Presenting (708) the modified EULA (706) to the user (712) informs the user that the modified EULA (706) governs access to the material requested by the user. Since the modified EULA (706) was modified based on pre-approved modified license terms (710), displaying the modified EULA (706) implicitly indicates to the user (712) that the terms of the modified EULA are acceptable.

For further explanation, consider the following example. A company has negotiated a license with a source of material subject to a EULA for its employees to access the material. The negotiated license is different than another EULA available to the general public for access to same material. In this example, in response to the user's request to access the material and in response to receiving the EULA available to the general public, terms of the modified license already negotiated with the source of the material are substituted for the terms of the EULA available to the general public.

As discussed above administering end-user license agreements is carried out in dependence upon license data. 'License data' refers to information about a EULA. The license data may include, for example, the text of a EULA, meta-data regarding the EULA, program code configured to allow the user to view the EULA and to accept or reject the EULA or any other information describing the EULA governing the requested material. In the examples above, license data was explicitly received in response to a user request for material subject to a EULA. In some embodiments of the present invention, however, license data itself is inferred. For further explanation, FIG. 9 sets forth a flow chart illustrating an exemplary computer-implemented method for inferring license data thereby identifying material that is subject to a EULA. The method of FIG. 9 includes receiving (802) a response (404) to a user's request (800) for access to material (801) on source server (401). At the time the request (800) for access to the material (801) is made, it is not known by the user whether access to the material (801) is subject to a EULA (432).

Figure 9:
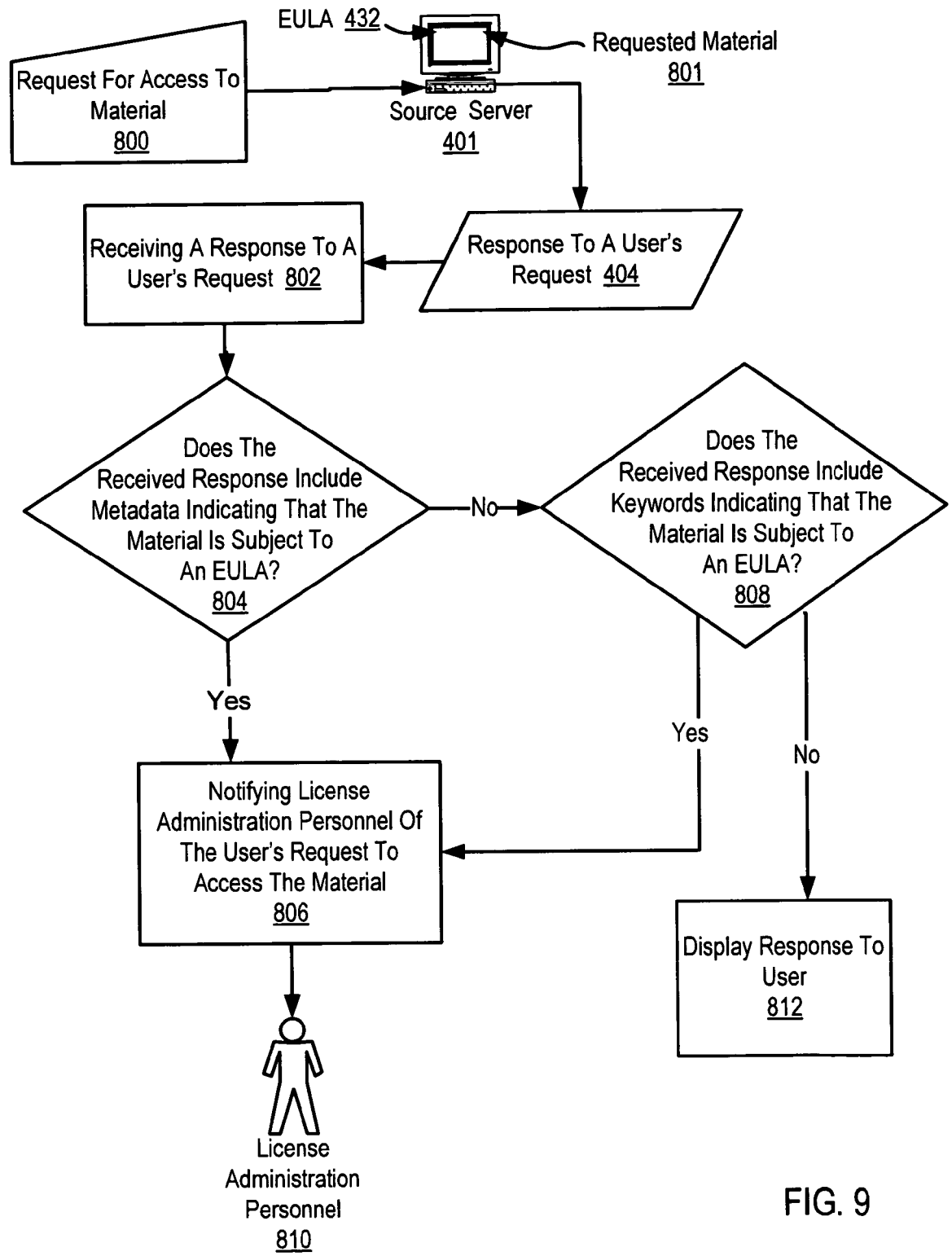
FIG. 9 sets forth a flow chart illustrating an exemplary computer-implemented method for identifying material subject to an end-user license agreement.

The method of FIG. 9 also includes determining (804) whether the received response (404) includes metadata identifying that the material in the response is subject to a EULA. Metadata in the response that may indicate that the material is subject to a EULA may include, for example, an XML license tag, an identification of a company that owns the requested material (801), and other metadata as will occur to those of skill in the art.

If the received response (404) includes metadata identifying that the material in the response is subject to a EULA, the method of FIG. 9 includes notifying (806) license administration personnel (810) of the user's request to access the material. Notifying (806) license administration personnel (810) of the user's request to access the material may typically be carried out by sending an electronic message, for example, an email message, a log entry or instant messaging text to the license administration personnel (810).

If the received response (404) does not include metadata identifying that the material in the response is subject to a EULA, method of FIG. 9 also includes determining (808) whether the received response (404) includes keywords indicating that the material is subject to an EULA. 'Keywords' refers to individual words or groups of words that may be commonly found in or associated with EULAs. Examples of keywords in the present context may include, but are not limited to, "must accept," "indemnify," "license," "terms and conditions," and so on. The presence of such keywords in the response may indicate that the material is subject to an EULA.

If the received response (404) includes keywords indicating that the material is subject to an EULA, the method of FIG. 9 also includes notifying (806) license administration personnel (810) of the user's request to access the material. Notifying (806) license administration personnel (810) of the user's request to access the material may typically be carried out by sending an electronic message, for example, an email message, a log entry or instant messaging text to the license administration personnel (810).

If there is no indication that the material is subject to an EULA, the requested material contained in the response (404) is displayed (812) to the user. That is, the material is provided to the requesting user without intervention.

As discussed above, administering end-user license agreements is carried out by use of one or more license administration rules. For further explanation, FIG. 10 sets forth a flow chart illustrating an exemplary computer-implemented method for creating rules for the administration of EULAs according to embodiments of the present invention. The method of FIG. 10 includes identifying (308), from historical license data (302), a license administration pattern (314). A license administration pattern is a trend in the manner in which EULAs, terms in EULAs, or material subject to EULAs are administered for an organization. Identifying a license administration pattern may be carried out by a user by reviewing previously accepted EULAs and previously rejected EULAs and identifies a pattern of license administration.

Figure 10:
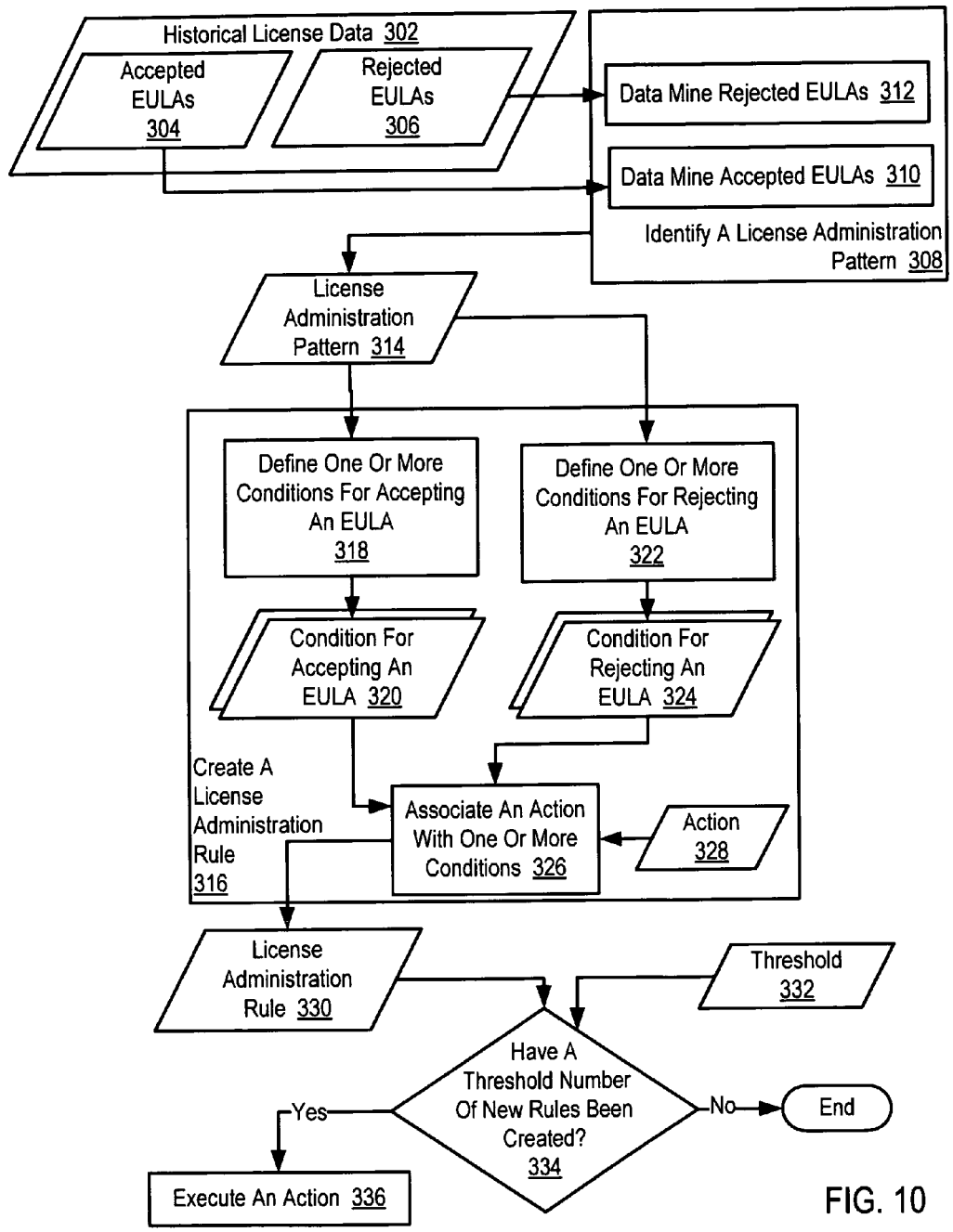
FIG. 10 sets forth a flow chart illustrating an exemplary computer-implemented method for creating rules for the administration of end-user license agreements.

Requiring a user to review previously accepted and rejected EULAs to identify license administration patterns may be cumbersome. In the method of FIG. 10, therefore, identifying (308) a license administration pattern (314) from historical license data (302) is carried out by data mining (310) a collection of accepted EULAs (304) and data mining (312) a collection of rejected EULAs (306). For the purpose of this specification, data mining means analyzing historical license data and discovering relationships, patterns, knowledge, or information from the historical license data and using the discovered relationships, patterns or knowledge to identify license administration patterns. Many data mining techniques typically include the steps of preparing the data for data mining, choosing an appropriate data mining algorithm, and deploying the data mining algorithm.

Preparing the historical license data for data mining includes providing a predetermined structure for the historical license data. The particular predetermined structures for each particular kind of license data may vary depending on factors such as the type of license data. However, in typical embodiments, each element of license data of a given kind will share a predefined structure thereby facilitating mining those license data elements for license administration patterns.

Data mining also typically includes choosing an appropriate data mining algorithm. An appropriate data mining algorithm for discovering license administration patterns will vary on many factors such as the type of saved license data available to mine, the available computer software and hardware used to carry out the data mining, the size of the collection of historical license data, or any other factor that will occur to those of skill in the art. Many data mining algorithms exist and all algorithms that appropriately find license administration patterns from a collection of historical license data are within the scope of the present invention.

Although many data mining algorithms exist, many of the data mining algorithms share the same goals. Typical data mining algorithms attempt to solve the problem of being overwhelmed by the volume of data that computers can collect. Data mining algorithms also typically attempt to shield users from the unwieldy body of data by analyzing it, summarizing it, or drawing conclusions from the data that the user can understand. Data mining algorithms also typically attempt to identify patterns in the data that may be used to develop rules consistent with the pattern in order to automate administration of a process which generated the data, such as a license administration process.

One way of discussing various data mining algorithms is by discussing the functions that they perform rather than the specifics of their underlying mathematical operation. Another way of discussing various data mining algorithms is by describing a "rule" returned by the data mining algorithm. A rule is a description of the relationship, pattern, knowledge, or information found by the data mining algorithm. Exemplary data mining algorithms are explained in this specification by describing the functions they perform and the rules they return. The following examples of data mining algorithms are included in this specification for clarity of discussion, not for limitation. Any method of data mining that will occur to those of skill in the art, regardless of type, classification, or underlying mathematical operation, is within the scope of the present invention.

In some examples, identifying a license administration pattern from historical license data includes data mining with an association function. Association functions are typically used to find patterns having connected or related events. For example, in the context of identifying license administration patterns, data mining with association functions may identify a license administration pattern such as "95% of shareware EULAs that were received were referred to the legal department for individual review." Such an identified pattern may lead to a rule such as "If a received EULA is for shareware, then the EULA should be sent to the legal department for review."

In still other examples, identifying a license administration pattern from historical license data includes data mining with a classification operator. A classification operator is applied to a set of historical license data that are organized or 'tagged' as belonging to a certain class, such as for example, historical license data related to open source software. A classification operator examines the set of tagged license data and produces a function that identifies the class. Such a classification operator can be used, for example, to analyze an EULA that was just received to determine a classification to which it belongs. For example, the classification operator may analyze the received EULA to determine if the EULA relates to open source software or not.

In still other examples, identifying a license administration pattern from historical license data includes data mining with a clustering operator. By contrast to data mining with a classification operator whose input are a set of tagged data, the inputs to a clustering operator are a set of untagged data. That is, no classes are known at the time the clustering operator is applied. Data mining with a cluster operator may be used to segment or classify the historical license data, such as by segmenting the license data clauses found in the EULA. Many of the underlying operations used to build classification operators can also be used to build clustering operators.

While various data mining algorithms have been discussed separately, in the various examples above, different data mining algorithms can be used together to identify license administration patterns for the user. Furthermore, any method identifying a subset of the historical license data that comprise a license administration pattern is within the scope of the present invention, not just data mining. In various exemplary embodiments, identifying a subset of historical license data that comprise a license administration pattern includes using data discrimination, using artificial intelligence, using machine learning, using pattern recognition, or any method of identifying a subset of historical license data that comprise a license administration pattern that will occur to those of skill in the art.

One example of off-the-shelf data mining software includes IBM's® "Intelligent Miner." "Intelligent Miner" can be operated in several computing environments including AIX, AS/400, and OS/390. The Intelligent Miner is an enterprise data mining tool, designed for client/server configurations and optimized to mine very large data sets, such as gigabyte data sets. The Intelligent Miner includes a plurality of data mining techniques or tools used to analyze large databases and provides visualization tools used to view and interpret the different mining results.

Many data mining processes used to identify license administration patterns are statistical or probabilistic. It is therefore possible to find patterns in the historical license data that have little or nothing to do with approving or rejecting a future EULA. That is, methods used to find a license administration pattern can return patterns that are unnecessary, undesirable, or inefficient in identifying a rule for determining whether terms of an EULA are acceptable. Many examples of identifying a license administration pattern from historical license data therefore include editing an identified subset of historical license data, such as by deleting one or more data elements from the subset, before defining the license administration pattern.

The method of FIG. 10 also includes creating (316), in dependence upon the license administration pattern (314), a license administration rule (330). In the method of FIG. 10, creating (316) a license administration rule (330) includes defining (318), in dependence upon the license administration pattern (314), one or more conditions (320) for accepting a EULA. For further explanation, consider the following condition of accepting a EULA:

```
IF EULA ID = EULA1234
    THEN AcceptCondition = True
```

In the example above the condition for accepting the EULA is premised on an identification of the EULA. If the EULA ID is 'EULA1234' then the condition for accepting the EULA is met.

In the method of FIG. 10, creating (316) a license administration rule (330) also includes defining (322), in dependence upon the license administration pattern (314), one or more conditions (324) for rejecting a EULA. For further explanation, consider the following condition for rejecting a EULA:

```
IF EULA includes keyword = 'arbitration'
    THEN acceptCondition = False
```

In the example above the condition for rejecting the EULA is premised on an identification of the keyword 'arbitration' within the EULA. If the word 'arbitration' is contained in the EULA, then a condition for rejecting the EULA is met.

In the method of FIG. 10, creating (316) a license administration rule (330) also includes associating (326) an action (328) with the one or more conditions (320) for accepting an EULA and associating (326) an action (328) with the one or more conditions (324) for rejecting an EULA. Associating (326) an action (328) with the one or more conditions (320, 324) may be carried out by identifying an action for execution when one or more of the conditions for accepting or rejecting the EULA are met. For further explanation, consider the following condition for acceptance with an associated action.

```
IF EULA ID = EULA1234;
    THEN AcceptCondition = True
    ACTION = sendAcceptMessage( )
```

In the example above the condition for accepting the EULA is premised on an identification of the EULA. If the EULA ID is 'EULA1234' then a condition for accepting the EULA is met and an associated action "SendAcceptMessage( )" is executed to send a user a message instructing the user to accept the license.

The method of FIG. 10 also includes determining (334) whether a threshold (332) number of new license administration rules (330) have been created executing (336) an action. Determining (334) whether a threshold (332) number of new license administration rules have been created may be carried out by comparing a cumulative count of new license administration rules (330) to a threshold (332). The threshold is a configurable, predefined number of new license administration rules that must be created before the action is executed.

The action executed (336) is a configurable, predefined action to be taken when the threshold number of new license has been created. Such actions may advantageously be used to notify users that a number of new license administration rules have been created. For further clarification, consider the following example. An action is executed that sends a notification to selected users of a license administration system when more than fifty new license administration rules have been created. In this example, the notified users are advised that they may attempt to retrieve material subject to EULAs that were previously rejected.

Because license administration rules governing the administration of EULAs may change over time, some new license administration rules may supersede old license administration rules. For further explanation, therefore, FIG. 11 sets forth a flow chart illustrating an exemplary computer-implemented method for determining whether one or more new license administration rules supersede one or more old license administration rules. An old license administration rule is any existing license administration rule. The term 'old' is not used to indicate any requirement of age and is used herein to distinguish such an existing license administration rule from a newly created license administration rule.

Figure 11:
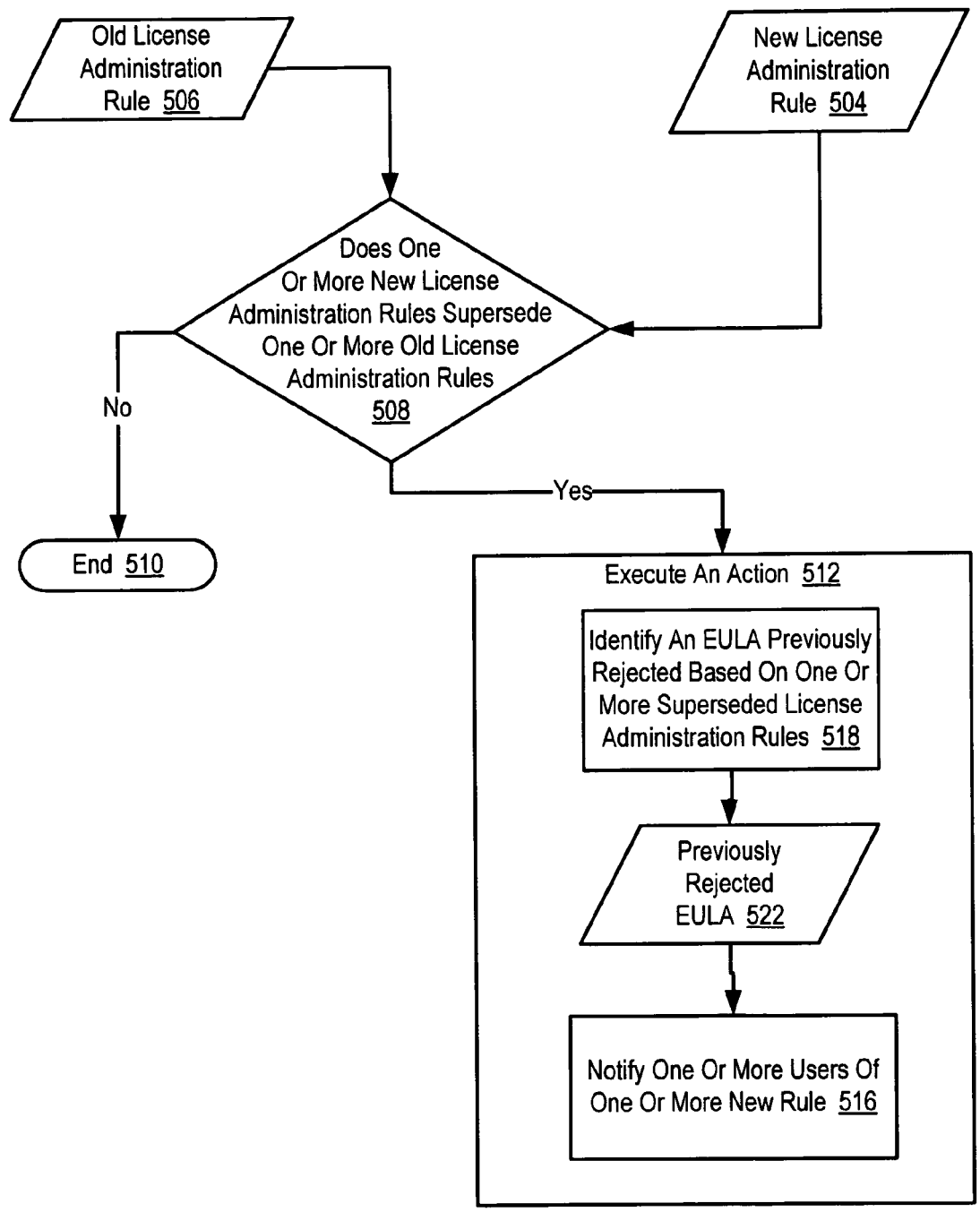
FIG. 11 sets forth a flow chart illustrating an exemplary computer-implemented method for creating rules for the administration of end-user license agreements.

The method of FIG. 11 includes determining (508) whether one or more new license administration rules (504) supersede one or more old license administration rules (506). A new license administration rule supersedes an old license administration rule if a EULA rejected by the new license administration rule is acceptable under an old license administration rule, or if a EULA acceptable under the new license administration rule is rejected by the old license administration rule. If no new license administration rules supersede old license administration rules, the method of FIG. 11 ends (510).

The method of FIG. 11 also includes executing (512) an action in response to determining (508) that one or more new license administration rules (504) supersede one or more old license administration rules (506). In the exemplary method of FIG. 11, executing (512) an action in response to determining (508) that one or more new license administration rules (504) supersede one or more old license administration rules (506) includes identifying (518) from historical license data a EULA (522) previously rejected based on one or more superseded license administration rules and notifying (516) one or more users of one or more new rules in the method of FIG. 11.

Exemplary embodiments of the present invention are described largely in the context of a fully functional computer system for administration of end-user license agreements. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for creating rules for the administration of end-user license agreements ('EULAs'), the method comprising:
   identifying, by one or more processors, from historical license data, a license administration pattern, the license administration pattern representing a trend in an organization's administration of the EULAs, terms in the EULAs, or material subject to the EULAs;
   creating, in dependence upon the license administration pattern, a license administration rule, the license administration rule representing a conditional expression used to establish conditions for accepting or rejecting the EULAs;
   receiving, by the one or more processors, a request by a user to access material that is subject to at least one EULA of the EULAs;
   determining, by the one or more processors, whether the at least one EULA is to be accepted or rejected based on the license administration rule;
   in response to determining that the at least one EULA is to be accepted, causing, by the one or more processors, a message to be displayed on a display screen to instruct the user to accept the EULA; and
   in response to determining that the at least one EULA is to be rejected, causing, by the one or more processors, a different message to be displayed on a display screen to instruct the user to reject the EULA.

2. The method of claim 1 wherein identifying, from historical license data, a license administration pattern further comprises data mining a collection of accepted EULAs.

3. The method of claim 1 wherein identifying, from historical license data, a license administration pattern further comprises data mining a collection of rejected EULAs.

4. The method of claim 1 wherein creating, in dependence upon the license administration pattern, a license administration rule further comprises:
   defining, in dependence upon the license administration pattern, one or more conditions for accepting an EULA.

5. The method of claim 4 further comprising associating an action with the one or more conditions.

6. The method of claim 1 wherein creating in dependence upon the license administration pattern a license administration rule further comprises:
   defining, in dependence upon the license administration pattern, one or more conditions for rejecting an EULA.

7. The method of claim 6 further comprising associating an action with the one or more conditions.

8. The method of claim 1 further comprising determining whether one or more new license administration rules supersede one or more old license administration rules.

9. A system for creating rules for the administration of end-user license agreements ('EULAs'), the system comprising at least one computer processor, at least one computer memory operatively coupled to the computer processor, and computer program instructions disposed within the computer memory, wherein the computer program instruction, when executed by computer processor cause the computer processor to take the steps of:
   identifying, by one or more processors, from historical license data, a license administration pattern, the license administration pattern representing a trend in an organization's administration of the EULAs, terms in the EULAs, or material subject to the EULAs;
   creating, by the license administration server, in dependence upon the license administration pattern, a license administration rule, the license administration rule representing a conditional expression used to establish conditions for accepting or rejecting the EULAs;
   receiving, by the one or more processors, a request by a user to access material that is subject to at least one EULA of the EULAs;
   determining, by the one or more processors, whether the at least one EULA is to be accepted or rejected based on the license administration rule;
   in response to determining that the at least one EULA is to be accepted, causing, by the one or more processors, a message to be displayed on a display screen to instruct the user to accept the EULA; and
   in response to determining that the at least one EULA is to be rejected, causing, by the one or more processors, a different message to be displayed on a display screen to instruct the user to reject the EULA.

10. The system of claim 9 wherein the computer memory also has disposed within it computer program instructions capable of data mining a collection of accepted EULAs.

11. The system of claim 9 wherein the computer memory also has disposed within it computer program instructions capable of data mining a collection of rejected EULAs.

12. The system of claim 9 wherein the computer memory also has disposed within it computer program instructions capable of:
defining, in dependence upon the license administration pattern, one or more conditions for accepting an EULA; and
associating an action with the one or more conditions.

13. The system of claim 9 wherein the computer memory also has disposed within it computer program instructions capable of:
defining, in dependence upon the license administration pattern, one or more conditions for rejecting an EULA; and
associating an action with the one or more conditions.

14. A computer program product for creating rules for the administration of end-user license agreements ('EULAs'), the computer program product embodied on a computer-readable non-transmission medium, the computer program product comprising computer program instructions for causing one or more processors to perform operations comprising:
identifying, by one or more processors, from historical license data, a license administration pattern, the license administration pattern representing a trend in an organization's administration of the EULAs, terms in the EULAs, or material subject to the EULAs; and
creating, in dependence upon the license administration pattern, a license administration rule, the license administration rule representing a conditional expression used to establish conditions for accepting or rejecting the EULAs;
receiving, by the one or more processors, a request by a user to access material that is subject to at least one EULA of the EULAs;
determining, by the one or more processors, whether the at least one EULA is to be accepted or rejected based on the license administration rule;
in response to determining that the at least one EULA is to be accepted, causing, by the one or more processors, a message to be displayed on a display screen to instruct the user to accept the EULA; and
in response to determining that the at least one EULA is to be rejected, causing, by the one or more processors, a different message to be displayed on a display screen to instruct the user to reject the EULA.

15. The computer program product of claim 14 wherein the computer-readable medium comprises a recordable medium.

16. The computer program product of claim 14 wherein computer program instructions for identifying, from historical license data, a license administration pattern further comprise computer program instructions for data mining a collection of accepted EULAs.

17. The computer program product of claim 14 wherein computer program instructions for identifying, from historical license data, a license administration pattern further comprise computer program instructions for data mining a collection of rejected EULAs.

18. The computer program product of claim 14 wherein computer program instructions for creating, in dependence upon the license administration pattern, a license administration rule further comprise:
computer program instructions for defining, in dependence upon the license administration pattern, one or more conditions for accepting an EULA; and
computer program instructions for associating an action with the one or more conditions.

19. The computer program product of claim 14 wherein computer program instructions for creating in dependence upon the license administration pattern a license administration rule further comprise:
computer program instructions for defining, in dependence upon the license administration pattern, one or more conditions for rejecting an EULA; and
computer program instructions for associating an action with the one or more conditions.

20. A computer-implemented method for creating rules for the administration of end-user license agreements ('EULAs'), the method comprising:
identifying, by one or more processors, from historical license data, using data mining, a license administration pattern, the license administration pattern representing a trend in an organization's administration of the EULAs, terms in the EULAs, or material subject to the EULAs, wherein data mining includes analyzing the historical license data and discovering relationships for determining the license administration pattern; and
creating, in dependence upon the license administration pattern, a license administration rule, the license administration rule representing a conditional expression used to establish conditions for accepting or rejecting the EULAs;
receiving, by the one or more processors, a request by a user to access material that is subject to at least one EULA of the EULAs;
determining, by the one or more processors, whether the at least one EULA is to be accepted or rejected based on the license administration rule;
in response to determining that the at least one EULA is to be accepted, causing, by the one or more processors, a message to be displayed on a display screen to instruct the user to accept the EULA; and
in response to determining that the at least one EULA is to be rejected, causing, by the one or more processors, a different message to be displayed on a display screen to instruct the user to reject the EULA.

21. The method of claim 1, wherein the trend comprises a condition to reject the EULA because of inclusion of at least one term of the terms in the EULA.

22. The method of claim 1, further comprising:
creating an additional number of license administration rules representing conditional expressions used to establish conditions for accepting or rejecting the EULAs;
determining a cumulative count of license administration rules that includes the license administration rule and the additional number of license administration rules;
in response to the cumulative count exceeding a threshold, notifying one or more users that previously attempted to receive approval of a EULA but was rejected, wherein the notifying includes a notification that the one or more users should retry an attempt to receive approval of the EULA.

* * * * *